(12) United States Patent
Elsharif

(10) Patent No.: US 11,414,513 B2
(45) Date of Patent: Aug. 16, 2022

(54) METHOD OF PRODUCING A CARBON NANOTUBE GRAFTED ACRYLIC ACID/ACRYLAMIDE COPOLYMER NANOCOMPOSITE SORBENT

(71) Applicant: Imam Abdulrahman Bin Faisal University, Dammam (SA)

(72) Inventor: Asma Mohammed Zamil Elsharif, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 319 days.

(21) Appl. No.: 16/657,208

(22) Filed: Oct. 18, 2019

(65) Prior Publication Data
US 2021/0115180 A1   Apr. 22, 2021

(51) Int. Cl.
| | | |
|---|---|---|
| *C08F 292/00* | (2006.01) | |
| *B01J 20/26* | (2006.01) | |
| *B01J 20/20* | (2006.01) | |
| *C01B 32/174* | (2017.01) | |

(Continued)

(52) U.S. Cl.
CPC .......... *C08F 292/00* (2013.01); *B01J 20/205* (2013.01); *B01J 20/261* (2013.01); *B01J 20/3416* (2013.01); *B01J 20/3425* (2013.01); *C01B 32/16* (2017.08); *C01B 32/174* (2017.08); *C02F 1/288* (2013.01); *B01J 20/3078* (2013.01); *B01J 20/3085* (2013.01); *C01P 2002/01* (2013.01); *C01P 2002/72* (2013.01); *C01P 2002/82* (2013.01); *C01P 2004/03* (2013.01); *C02F 1/283* (2013.01); *C02F 1/285* (2013.01); *C02F 2101/345* (2013.01); *C02F 2303/16* (2013.01); *C02F 2305/08* (2013.01)

(58) Field of Classification Search
None
See application file for complete search history.

(56) References Cited

U.S. PATENT DOCUMENTS

| | | |
|---|---|---|
| 7,829,622 B2 | 11/2010 | McDaniel et al. |
| 2007/0232748 A1 | 10/2007 | Guerret et al. |

(Continued)

FOREIGN PATENT DOCUMENTS

| | | |
|---|---|---|
| CN | 101693125 B | 6/2013 |
| CN | 107774237 A | 3/2018 |
| CN | 108559021 A | 9/2018 |

OTHER PUBLICATIONS

Chen et al., Preparation of Poly(acrylic acid) Grafted Multiwalled Carbon Nanotubes by a Two-Step Irradiation Technique, Macromolecules 2006, 39, 330-334 (Year: 2006).*

(Continued)

*Primary Examiner* — Chester T Barry
(74) *Attorney, Agent, or Firm* — Oblon, McClelland, Maier & Neustadt, L.L.P.

(57) ABSTRACT

A method for producing a nanocomposite sorbent comprising carbon nanotube-grafted acrylic acid/acrylamide copolymer which involves copolymerization of acrylic acid and acrylamide in the presence of an aqueous dispersion of carbon nanotubes. The method yields a nanocomposite sorbent material having a reversible adsorption capacity phenol of 5 to 2500 μg of phenol per mg of nanocomposite sorbent. Also disclosed is a method for removing organic pollutants from water using the nanocomposite sorbent.

18 Claims, 8 Drawing Sheets

(51) Int. Cl.
  *C01B 32/16*   (2017.01)
  *B01J 20/34*   (2006.01)
  *C02F 1/28*    (2006.01)
  *C02F 101/34*   (2006.01)
  *B01J 20/30*    (2006.01)

(56) References Cited

U.S. PATENT DOCUMENTS

2016/0251563 A1* 9/2016 Stanciu .................. C09K 8/514
                                                    166/292
2021/0251491 A1* 8/2021 Zharov .............. G01N 15/1459

OTHER PUBLICATIONS

Chen, Preparation of Poly(acrylic acid) Grafted Multiwalled Carbon Nanotubes by a Two-Step Irradiation Technique, Macromolecules 2006, 39, 330-334 (Year: 2006).*

Gomez-Vazquez, et al. ; Homogeneous hydrogels made with acrylic acid, acrylamide acryla and chemically functionalized carbon nanotubes ; Journal of Macromolecular Science, Part A—Pure and Applied Chemistry, vol. 56, Issue 5 ; Mar. 7, 2019 ; Abstract Only; 2 Pages.

Xu, et al. ; Removal of p-chlorophenol from aqueous solutions by carbon nanotube hybrid polymer adsorbents ; Chemical Engineering Research and Design, vol. 123 ; pp. 76-83 ; Jul. 2017 ; Abstract Only ; 3 Pages.

Issabayeva, et al. ; A review on the adsorption of phenols from wastewater onto diverse groups of adsorbents ; Reviews in Chemical Engineering vol. 34, Issue 6 ; https://doi.org/10.1515/revce-2017-0007 ; Sep. 23, 2017 ; 1 Page.

* cited by examiner

METHOD OF PRODUCING A CARBON NANOTUBE GRAFTED ACRYLIC ACID/ACRYLAMIDE COPOLYMER NANOCOMPOSITE SORBENT

BACKGROUND OF THE INVENTION

Field of the Invention

The present disclosure relates to a method of preparing a nanocomposite sorbent comprising carbon nanotube-grafted acrylic acid/acrylamide copolymer composite, the nanocomposite sorbent produced by the method, and a method of removing an organic pollutant from water by adsorption using the nanocomposite sorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Phenol and phenol derivatives have become one of the most prominent pollutants in industrial wastewater. Due to its structure and physicochemical nature, phenol may disrupt endocrine systems and adversely influence aquatic life as well as human life [L. K. Boateng, J. Heo, J. R. V. Flora, Y. G. Park, Y. Yoon, Sep. Purif. Technol., 116, (2013) 471-478]. Phenols may also block and mimic the activity of natural hormones [Y. Park, Z. Sun, G. A. Ayoko, R. L. Frost, Chemosphere, 107, (2014) 249-256].

Phenols, as organic compounds, are widely used in a variety of industrial applications, for example as monomers for the synthesis of polycarbonates as well as in epoxy resins by the plastics industry. Phenol and phenol derivatives are also used by other industries such as pesticides, paint, steel mill, and petrochemical [J. C. Lazo-Cannata, A. Nieto-Márquez, A. Jacoby, A. L. Paredes-Doig, A. Romero, M. R. Sun-Kou, J. L. Valverde, Sep. Purif. Technol., 80, (2011) 217-224; D. Hank, Z. Azi, S. A. Hocine, O. Chaalal, A. Hellal, J. Ind. Eng. Chem., 20, (2014) 2256-2263; and J. Huang, X. Jin, S. Deng, Chem. Eng. J., 192, (2012) 192-200]. Phenol is considered one of the major pollutants in wastewater because of its negative impact on the environment. According to the World Health Organization (WHO), the maximum allowed level of phenol in potable water is 1 μg/L [L. Zhu, Y. Deng, J. Zhang, J. Chen, J. Colloid Interfaces Sci., 364, (2011) 462-468 and S. P. Kamble, P. A. Mangrulkar, A. K. Bansiwal, S. S. Rayalu, Chem. Eng. J. 138, (2008) 73-83].

Because of their ubiquitous use in industry and the enormous potential for environmental impact, it is essential to mitigate the amount of phenol that is released during industrial use. [S. Li, Y. Gong, Y. Yang, C. He, L. Hu, L. Zhu, L. Sun, D. Shu, Chem. Eng. J., 260, (2015) 231-239]. Thus, there is a need to develop an efficient and cost-effective technology for the effective removal of phenol from industrial wastewaters.

Common technologies used to remove phenol include photocatalytic degradation [A. Shet and S. K. Vidya, Solar Energy, 127, (2016) 67-78], ozonation [H. Biglari, M. Afsharnia, V. Alipour, R. Khosravi, K. Sharafi and A. H. Mahvi, Environmental Science and Pollution Research, 24,4, (2017) 4105-4116], extraction methods [J. Liu, J. Xie, Z. Ren and W. Zhang, Desalination and Water Treatment, 51, 19-21, (2013) 3826-3831], biological methods [C. Liu, K. Han, D. J. Lee and Q. Wang, Applied microbiology and biotechnology, 100, 9, (2016) 4211-4217], membrane-based separation [Y. Cui, X. Y. Liu, T. S. Chung, M. Weber, C. Staudt and C. Maletzko, Water research, 91, (2016) 104-114], electrochemical advanced oxidation methods [E. Mousset, L. Frunzo, G. Esposito, E. D van Hullebusch, N. Oturan and M. A. Oturan, Applied Catalysis B: Environmental, 180, (2016) 189-198] and ion exchange [M. D. Victor-Ortega, J. M. Ochando-Pulido and A. Martinez-Ferez, Process Safety and Environmental Protection, 100, (2016) 242-251]. These methods have their drawbacks which include huge costs, partial degradation, non-reusability, and generation of secondary pollutants and toxic sludge. Consequently, adsorption is one of the most appropriate techniques for the removal of phenol from water due to its inexpensiveness and effectiveness.

Also, the technique produces no toxic wastes. Its performance, however, is highly constrained by material design and properties [S. De Gisi, G. Lofrano, M. Grassi and M. Notarnicola, Sustainable Materials and Technologies, 9, (2016) 10-40].

Carbon-based materials like activated carbon (AC) have been conventionally been used as adsorbents [A. B. Albadarin, Maurice N. Collins, Mu. Naushad, Saeed Shirazian, Chem. Eng. J., 307, (2017) 264-272 and J. Wang and B. Chen, Chemical Engineering Journal, 281, (2015) 379-388]. However, their activity is limited by surface area. Recently, there is a rise in the applications of nano-based materials for the adsorption of toxic pollutants [X. Wang, B. Liu, Q. Lu and Q. Qu, Journal of Chromatography A, 1362, (2014) 1-15 and A. A. Alqadami, Mu. Naushad, M. A. Abdalla, T. Ahmad, Z. A. A L Othman, S. M. A L Shehri, A. A. Ghfar, J. Cleaner Production, 156, (2017) 426-436]. Among nanomaterials, the use of graphene for wastewater remediation is becoming more popular [C. Liu, D. Zhang, L. Zhao, X. Lu, P. Zhang, S. He, G. Hu and X. Tang, RSC Advances, 6, 114, (2016) 113352-113365]. Graphene is an allotrope of carbon consisting of a single layer of carbon atoms arranged in a hexagonal lattice. It is considered an excellent adsorbent due to its unique characteristics such as high specific surface area and ease of synthesis from graphite using an uncomplicated method involving chemical oxidation, exfoliation, and reduction. It has been used for the adsorption of several pollutants, such as dyes [V. K. Gupta, R. Kumar, A. Nayak, T. A. Saleh and M. A. Barakat, Advances in Colloid and Interface Science, 193, (2013) 24-34], toxic ions [T. A. Saleh, A. Sari and M. Tuzen, Chemical Engineering Journal, 307, (2017) 230-238] and organic contaminants [L. Ji, W. Chen, Z. Xu, S. Zheng and D. Zhu, Journal of environmental quality, 42, 1, (2013) 191-198].

The tendency of graphene and its derivatives to aggregate to reform graphite and their weak affinity for binding anionic pollutants are considered disadvantages to their applications. Nevertheless, these disadvantages can be surpassed by covalent or non-covalent functionalization with different molecules. This surface functionalization makes graphene and its derivatives more sensitive and selective. Due to the availability of many materials that can be used for surface functionalization, the opportunities to study potential applications of these materials in the adsorptive treatment of wastewater are increasing [S. Chowdhury and R. Balasubramanian, Advances in colloid and interface science, 204, (2014) 35-56]. So far, a number of functionalized graphene, graphene oxide, and reduced graphene oxide have been successfully synthesized and extensively investigated as adsorbents for water purification. Materials used for functionalization of carbon nanostructures include organic polymers and nanosized metal oxide [B. Bolto and J. Gregory, Water research, 41, 11, (2007) 2301-2324 and R. K. Upadhyay, N. Soin and S. S. Roy, Rsc Advances, 4, 8, (2014) 3823-3851]. These materials can be grafted on the surface without any requirement of crosslinkers which usually reduce the binding sites for pollutants. Carbon nanotubes (CNTs) have been extensively used in many fields, including efficacious adsorbents for removal of contaminants [Xu J., Sheng T., Hu Y., Baig S. A., Lv X. and Xu X., Chem. Eng. J., 219, (2013) 162-173]. CNTs can adsorb organic contaminants because of their strong affinities [Mashallah Rezakazemi, Tonni Agustiono Kurniawan, Ahmad B. Albadarin, Saeed Shirazian, Journal of Molecular Liquids, 271, (2018) 24-30]. It was reported that the phenol removal mechanism in CNT is a combination of physical trapping and lateral surface adsorption. Grafting of CNT with polymeric branches could enhance the adsorption of phenol by introducing more active sites for trapping the phenol.

In view of the forgoing, one object of the present disclosure is to provide a method for producing a new nanocomposite sorbent material using carbon nanotubes and a copolymer of acrylic acid and acrylamide, which provides reduced aggregation and that may be advantageous for water purification in comparison to conventional materials. Another object of the present disclosure is to provide nanocomposite sorbents having increased adsorption capacities for phenol and other organic pollutants that may be conveniently reused and do not create toxic byproducts.

SUMMARY OF THE INVENTION

The present disclosure relates to a method of preparing a nanocomposite sorbent comprising carbon nanotube-grafted acrylic acid/acrylamide copolymer composite involving mixing an aqueous suspension of carbon nanotubes with acrylic acid and acrylamide to form a dispersion, adding a polymerization initiator to form a reaction mixture, heating the reaction mixture to a temperature of 25 to 100° C., and isolating the nanocomposite sorbent, wherein a weight ratio of acrylic acid to acrylamide in the reaction mixture is 0.75:1 to 1.25:1.

In preferred embodiments, the carbon nanotubes are present in the nanocomposite sorbent in an amount of 0.01 to 2 wt % based on a total weight of the nanocomposite sorbent.

In some embodiments, the carbon nanotubes have a length of 50 to 125 μm and an average diameter of 5 to 7 nm.

In some embodiments, the carbon nanotubes are prepared by a chemical vapor deposition method using ethylene at a temperature of 800 to 1100° C.

In some embodiments, the mixing comprises adding acrylamide to a suspension of carbon nanotubes then adding acrylic acid.

In preferred embodiments, the polymerization initiator is an alkali metal persulfate salt.

In preferred embodiments, the nanocomposite sorbent comprises 70 to 80 wt % carbon, 5 to 10 wt % nitrogen, and 10 to 25 wt % oxygen, based on a total weight of non-hydrogen elements of the nanocomposite sorbent.

In some embodiments, the nanocomposite sorbent has a phenol adsorption capacity of 5 to 2500 μg of phenol per mg of nanocomposite.

The present disclosure also relates to a nanocomposite sorbent comprising carbon nanotube-grafted acrylic acid/acrylamide copolymer composite, wherein carbon nanotube-grafted acrylic acid/acrylamide copolymer composite comprises 37.5 to 62.5 wt % of poly(acrylic acid), 0.01 to 2 wt % of carbon nanotubes, and the remaining wt % of polyacrylamide, each based on a total weight of the carbon nanotube-grafted acrylic acid/acrylamide copolymer composite, wherein a weight ratio of poly(acrylic acid) to polyacrylamide in the carbon nanotube-grafted acrylic acid/acrylamide copolymer composite is 0.75:1 to 1.25:1.

In preferred embodiments, the nanocomposite sorbent comprises 70 to 80 wt % carbon, 5 to 10 wt % nitrogen, and 10 to 25 wt % oxygen, each based on a total weight of non-hydrogen elements of the nanocomposite sorbent.

In some embodiments, the carbon nanotubes have a length of 50 to 125 μm and an average diameter of 5 to 7 nm.

In preferred embodiments, the nanocomposite sorbent has a reversible phenol adsorption capacity of 5 to 2500 μg of phenol per mg of nanocomposite sorbent.

In preferred embodiments, the nanocomposite retains 90 to 100% of the reversible phenol adsorption capacity after 6 cycles of adsorption-elution.

The current disclosure also relates to a method for removing an organic pollutant from water comprising contacting water containing the organic pollutant with the nanocomposite sorbent.

In some embodiments, the nanocomposite sorbent is employed in an amount of 0.2 to 20 mg per mL of the water.

In some embodiments, the method further comprises eluting the organic pollutant from the nanocomposite sorbent by washing with a wash solvent.

In some embodiments, the water has a pH of 6.5 to 14 and the nanocomposite sorbent is contacted with the water for 5 to 120 minutes.

In some embodiments, the organic pollutant is a phenol.

In preferred embodiments, the nanocomposite sorbent has a reversible phenol adsorption capacity of 5 to 2500 μg of phenol per mg of nanocomposite sorbent. In preferred embodiments, the nanocomposite sorbent retains 90 to 100% of the reversible phenol adsorption capacity after 6 cycles of adsorption-elution.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8A shows the normal plot of the standardized effects, FIG. 8B shows the main effects plots of response, and FIG. 8C shows the Pareto Chart of the standardized effect

DETAILED DESCRIPTION OF THE INVENTION

Figure 1:
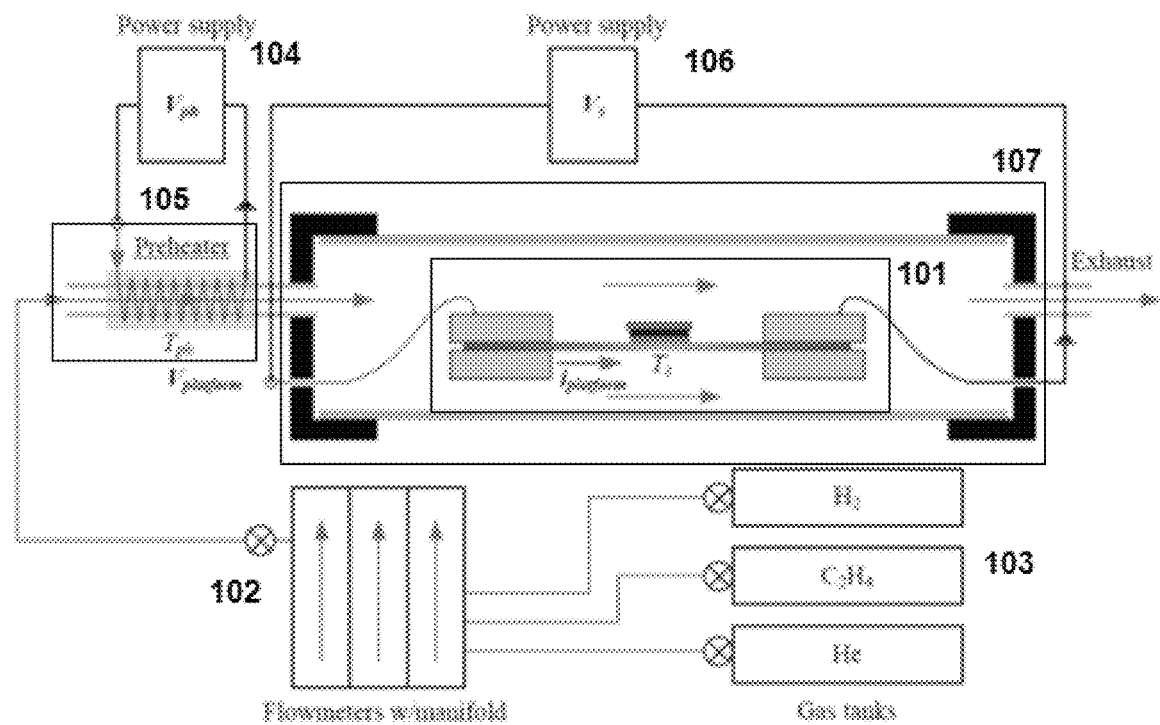
FIG. 1 shows a schematic depiction of the CNT chemical vapor deposition synthesis system.

In the following description, it is understood that other embodiments may be utilized and structural and operational changes may be made without departure from the scope of the present embodiments disclosed herein.
Definitions The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

As used herein, "adsorption" is the adhesion of atoms, ions or molecules from a gas, liquid, or dissolved solid to a surface. The process creates a film of an adsorbate (e.g. the first gas) on the surface of an adsorbent (e.g. the fluorinated carbon adsorbent). Chemisorption is a kind of adsorption which involves a chemical reaction between the adsorbate and adsorbent, i.e., new chemical bonds are generated at the adsorbent surface. In contrast with chemisorption is physisorption, which leaves the chemical species of the adsorbate and adsorbent intact chemically unchanged upon adsorption.
Method for Preparing Nanocomposite Sorbent According to a first aspect, the present disclosure relates to a method of making a nanocomposite sorbent. Generally, the method involves polymerizing acrylic acid and acrylamide in the presence of a suspension of carbon nanotubes at 25 to 100° C.

Carbon nanotubes can be classified by features such as their electrical properties, number of walls, the geometric configuration of the atoms that make up the nanotube. Classified by their electronic properties, carbon nanotubes can be either metallic or semiconducting. In this context, "metallic" means having no band gap and displaying conductivity similar to that of a metal, i.e. with a Fermi level lying in the conduction band of the material and a conductivity which decreases as temperature increases. In this context, "semiconducting" means having a band gap, a Fermi level lying in the band gap, and a conductivity that increases as temperature increases. Classified by their number of walls, carbon nanotubes can be single-walled carbon nanotubes (SWCNT) which have only one layer of carbon atoms arranged into a tube with an edge ring of carbon atoms, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indicies n and m. The indicies n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

Carbon nanotubes may further be described by the functionalization of the carbon nanotubes after synthesis. Examples of functionalization types that carbon nanotubes may be subjected to include covalent modification and non-covalent modification. Examples of covalent modifications include oxidation, esterification, amidation, halogenation, cycloaddition, radical addition, nucleophilic addition, or electrophilic addition. Examples of non-covalent modifications include association of aromatic or other molecules containing a π-electron system, or wrapping or encasement in polymeric or dendrimeric materials such as proteins, polymers, polysaccharides, phospholipids, or the like. Carbon nanotubes that have not undergone a functionalization procedure after synthesis are known as "pristine carbon nanotubes".

In preferred embodiments, the carbon nanotubes are pristine carbon nanotubes. In preferred embodiments, the carbon nanotubes are connected directly to a main carbon chain of an acrylic acid/acrylamide copolymer. In preferred embodiments, the connection between the carbon nanotubes and the main carbon chain of the acrylic acid/acrylamide copolymer is a covalent bond. In preferred embodiments, the aforementioned covalent bond is a carbon-carbon bond. In preferred embodiments, the aforementioned carbon-carbon bond includes a carbon that is either in the tube or on the edge ring of the carbon nanotube.

In preferred embodiments, the carbon nanotubes have an average length of 50 to 125 μm, preferably 55 to 120 μm, preferably 60 to 115 μm, preferably 65 to 110 μm, preferably 70 to 105 μm, preferably 75 to 100 μm, preferably 80 to 95 μm, preferably 85 to 90 μm. In preferred embodiments, the carbon nanotubes have an average diameter of 5 to 7 nm, preferably 5.1 to 6.9 nm, preferably 5.2 to 6.8 nm, preferably 5.3 to 6.7 nm, preferably 5.5 to 6.6 nm, preferably 5.6 to 6.5 nm, preferably 5.7 to 6.4 nm, preferably 5.8 to 6.3 nm, preferably 5.9 to 6.2 nm, preferably 6.0 to 6.1 nm.

Carbon nanotubes are typically made using methods including arc discharge, laser ablation, thermal plasma or plasma torch synthesis, chemical vapor deposition (CVD), liquid electrolysis, and controlled flame synthesis. The arc discharge method involves an arc discharge between electrodes, one or more of which are graphite. Laser ablation involves the irradiation of a graphite target with a pulsed laser at high temperature in an inert atmosphere. Plasma torch synthesis (also known as thermal plasma method) involves the use of a torch capable of producing jet or directed flow of plasma from a gas and an electrical discharge arc. It differs from the arc discharge method in that the carbon used to make the carbon nanotubes is in the plasma torch synthesis is derived from a carbon-containing gas, not vaporized graphite like in the arc discharge method. Liquid electrolysis involves electrolytic treatment of molten carbonate salts such as lithium carbonate. Controlled flame synthesis involves the use of natural flames from combustion of carbon-containing material. Chemical vapor deposition (CVD) involves the catalytic decomposition of a carbon-containing gas on a substrate at elevated temperature. In some embodiments, the carbon nanotubes are made by an arc discharge method, a laser ablation method, a thermal plasma or plasma torch synthesis method, a liquid electrolysis method, or a controlled flame synthesis method. In preferred embodiments, the carbon nanotubes are made using a CVD method. In preferred embodiments, the CVD method used to make the carbon nanotubes uses ethylene as the carbon-containing gas. In preferred embodiments, the CVD method used to make the carbon nanotubes is performed at 800 to 1100° C., preferably 820 to 1020° C. In preferred embodiments, the CVD method used to make the carbon nanotubes involves pre-heating the ethylene gas to 900 to 1100° C., preferably 950 to 1050° C., preferably 1000 to 1030° C., preferably to 1020° C. In preferred embodiments, the CVD method used to make the carbon nanotubes involves a growth chamber where the decomposition of the ethylene gas takes place that is kept at a temperature of 800 to 900° C., preferably 810 to 850° C., preferably 820° C.

In some embodiments, the carbon nanotubes are mixed with acrylamide and acrylic acid. In preferred embodiments, the carbon nanotubes are dispersed in water to form an aqueous suspension of carbon nanotubes that is mixed with acrylamide and acrylic acid. In preferred embodiments, the aqueous dispersion of carbon nanotubes is mixed with acrylamide to form an acrylamide-CNT dispersion, then acrylic acid is added to the acrylamide-CNT dispersion.

Following the mixing, a polymerization initiator is added to form a reaction mixture. In preferred embodiments, the polymerization initiator is an alkali metal or ammonium persulfate salt. In some embodiments, the polymerization initiator and/or dispersion are heated before the addition. In preferred embodiments, the polymerization initiator and/or dispersion are heated to a temperature of 40 to 60° C., preferably 45 to 55° C., preferably 50° C. In preferred embodiments, the polymerization initiator is added while the dispersion is at a temperature of 40 to 60° C., preferably 45 to 55° C., preferably 50° C. In preferred embodiments, the polymerization initiator is an alkali metal persulfate salt. In some embodiments, the polymerization initiator is potassium persulfate. In preferred embodiments, the weight ratio of the polymerization initiator to the acrylic acid present in the reaction mixture is 0.00001 to 0.1, preferably 0.00005 to 0.05, preferably 0.0001 to 0.01, preferably 0.0005 to 0.005, preferably 0.001. In preferred embodiments, the weight ratio of the acrylic acid to acrylamide in the reaction mixture is 0.75:1 to 1.25:1, preferably 0.8:1 to 1.2:1, preferably 0.85:1 to 1.15:1, preferably 0.9:1 to 1.1:1, preferably 0.95:1 to 1.05:1, preferably 1:1. In preferred embodiments, the weight ratio of the CNTs to the acrylic acid present in the reaction mixture is 0.00001 to 0.1, preferably 0.00005 to 0.05, preferably 0.0001 to 0.01, preferably 0.0005 to 0.005, preferably 0.001. Following the addition of the polymerization initiator, the reaction mixture is heated while stirring to afford the nanocomposite. In preferred embodiments, the reaction mixture is heated to 25 to 100° C., preferably 30 to 90° C., preferably 35 to 80° C., preferably 40 to 70° C., preferably 45 to 60° C., preferably 50° C. In some embodiments, the reaction mixture is heated while stirring for 0.5 to 48 hours, preferably 1 to 24 hours, preferably 2 to 20 hours, preferably 3 to 18 hours, preferably 4 to 16 hours. This step may be referred to as a "polymerization step".

Following the polymerization step, the nanocomposite may be collected by any solid-liquid separation technique known to those of ordinary skill in the art, for example, filtration, decantation, centrifugation, or the like, but excluding techniques such as evaporation. In preferred embodiments, the collected nanocomposite is dried. In some embodiments, the nanocomposite is dried at 30 to 130° C., preferably 40 to 120° C., preferably 50 to 110° C., preferably 60 to 100° C., preferably 70 to 90° C., preferably 75 to 85° C., preferably 80° C., preferably 95 to 105° C., preferably 100° C. for 1 to 72 hours, preferably 6 to 66 hours, preferably 12 to 60 hours, preferably 18 to 54 hours, preferably 24 to 50 hours, preferably 36 to 49 hours, preferably 48 hours. In some embodiments the nanocomposite may be reduced to a powder of small particles. In some embodiments, the nanocomposite may be reduced to a powder of small particles by a technique such as milling, grinding, ball milling, chopping, pulverizing, crushing, pounding, mincing, shredding, smashing, fragmenting, or another technique that may be used to reduce a material to smaller particles. In some embodiments, the technique may take place using a mill, ball mill, rod mill, autogenous mill, semi-autogenous grinding mill, pebble mill, buhrstone mill, burr mill, tower mill, vertical shaft impactor mill, grinder, pulverizer, mortar and pestle, blender, crusher, or other implement used to reduce a material to smaller particles. In preferred embodiments, the nanocomposite is reduced to a powder of particles with a size of 0.001 to 1000 μm, preferably 0.005 to 500 μm, preferably 0.01 to 100 μm, preferably 0.05 to 50 μm, preferably 0.075 to 25 μm, preferably 0.1 to 10 μm, preferably 0.25 to 7.5 μm, preferably 0.5 to 5 μm, preferably 0.6 to 4 μm. In preferred embodiments, nanocomposite is washed with a wash solvent to remove any impurities before the drying step. In preferred embodiments, the wash solvent is deionized water. In preferred embodiments, the nanocomposite is washed repeatedly until the washings have so visible sign of particulate matter, cloudiness, or color.

Nanocomposite Sorbent Comprising Carbon Nanotube Grafted Acrylic Acid/Acrylamide Copolymer Composite A second aspect of the disclosure relates to a nanocomposite sorbent comprising carbon nanotube grafted acrylic acid/acrylamide copolymer composite. In preferred embodiments, the nanocomposite sorbent has a carbon content of 70 to 80 wt %, preferably 71 to 79 wt %, preferably 72 to 77 wt %, preferably 73 to 75 wt %, a nitrogen content of 5 to 10 wt %, preferably 6 to 9.5 wt %, preferably 7 to 9 wt %, and an oxygen content of 10 to 25 wt %, preferably 12 to 24 wt %, preferably 13 to 22 wt %, preferably 15 to 20 wt %, preferably 17 to 19 wt %, each based on the total weight of the non-hydrogen elements of the nanocomposite sorbent. In preferred embodiments, the nanocomposite sorbent has a poly(acrylic acid) content of 37.5 to 62.5 wt %, preferably 40 to 60 wt %, preferably 42.5 to 57.5 wt %, preferably 45 to 55 wt %, preferably 47.5 to 50 wt %, preferably 48 to 49.95 wt %, and a carbon nanotube content of 0.001 to 2 wt %, preferably 0.005 to 1 wt %, preferably 0.01 to 0.1 wt %, preferably 0.05 wt %, and a polyacrylamide content of the remaining wt % of the nanocomposite sorbent, each based on the total weight of the nanocomposite sorbent. In preferred embodiments, the weight ratio of poly(acrylic acid) to polyacrylamide in the nanocomposite sorbent is 0.75:1 to 1.25:1, preferably 0.8:1 to 1.2:1, preferably 0.85:1 to 1.15:1, preferably 0.9:1 to 1.1:1, preferably 0.95:1 to 1.05:1, preferably 1:1.

In some embodiments, the nanocomposite sorbent is capable of adsorbing organic pollutants. In preferred embodiments, the nanocomposite sorbent is capable of adsorbing phenol. In preferred embodiments, the nanocomposite sorbent has a phenol adsorption capacity of 5 to 2500 μg, preferably 10 to 1000 μg, preferably 25 to 500 μg, preferably 50 to 250 μg of phenol per mg of nanocomposite sorbent.

In preferred embodiments, the adsorbed organic pollutants are adsorbed to the nanocomposite sorbent through interaction with the carbon nanotube, the acrylic acid/acrylamide copolymer, or both. In some embodiments, the interaction between the organic pollutant and the carbon nanotube are π-π interactions or electrostatic interaction or both. In some embodiments, the interaction of the organic pollutant and the acrylic acid/acrylamide copolymer are π-π interactions or hydrogen bonding or both.

In some embodiments, adsorbed organic pollutants can be eluted from the nanocomposite sorbent. In some embodiments, adsorbed organic pollutants can be eluted by washing with a wash solvent. In some embodiments, the wash solvent comprises an organic solvent. Examples of organic solvents include acetone, isopropanol, ethanol, methanol, butanol, ethyl acetate, tetrahydrofuran, methyl ethyl ketone, dimethylformamide, benzene, toluene, xylene, chloroform, dichloromethane, propylene carbonate, ethylene glycol, glycerol and mixtures thereof. In preferred embodiments, the wash solvent is an alcoholic solvent such as methanol, ethanol, propanol, butanol, and the like. In preferred embodiments, the nanocomposite sorbent retains 90 to 100%, preferably 91 to 99.9%, preferably 92 to 99.8%, preferably 93 to 99.7%, preferably 94 to 99.6%, preferably 95 to 99.5% of the phenol adsorption capacity after 6 cycles of adsorption-elution.

In some embodiments, the nanocomposite sorbent is comprised of particles having a mean particle size of 0.01 μm to 10 cm, preferably 0.1 μm to 5 cm, preferably 1 μm to 1 cm, preferably 10 to 500 μm. The particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, or some other shape. In one embodiment, the nanocomposite sorbent may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the particles of nanocomposite sorbent having a mean diameter as previously described. In some embodiments, the surface of the particles or agglomerates of the nanocomposite sorbent are irregular and non-smooth. In some embodiments, the surface of the nanocomposite sorbent have or comprise an irregular arrangement of fibers made of a copolymer or carbon nanotubes. In some embodiments, the irregular arrangement of fibers made of a copolymer or carbon nanotubes contains fibers that are randomly arranged, coiled, interwoven, overlapping, or otherwise tangled. In some embodiments, the irregular arrangement of fibers has the appearance of a web, net, knot, tangle, or other ordered or disordered arrangement of fibers.

Method for Removing an Organic Pollutant from Water

A third aspect of the disclosure relates to a method for removing an organic pollutant from water using the nanocomposite sorbent described above. In some embodiments, only one organic pollutant is present in the water. In alternative embodiments, a plurality of organic pollutants is present in the water. The method involves contacting the nanocomposite sorbent with water containing one or more organic pollutants.

In some embodiments, the organic pollutants may be a dye, a phenol, a polycyclic aromatic hydrocarbon, an herbicide, a pesticide, a persistent organic pollutant, or the like, preferably the organic pollutant is a phenol.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCF, FlAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

In some embodiments, the nanocomposite sorbent may be free flowing or supported on or within a substrate, for example, a column. Examples of supported nanocomposite sorbents include materials and geometries where the nanocomposite sorbent is supported within a fixed bed, a static packed bed, a fluidized bed, embedded in a porous support (such as a porous polymer matrix), in or on a ceramic support, in or on a polymer support, or in or on a silica support. In preferred embodiments, the nanocomposite sorbent is employed in an amount of 0.2 to 20 mg/mL, preferably 0.5 to 15 mg/mL, preferably 1 to 11 mg/mL, preferably 5 to 10 mg/mL of water to have organic pollutants removed.

In some embodiments, the method involves addition of powdered nanocomposite sorbent to the water to have an organic pollutant be removed to form a purification mixture. In some embodiments, the purification mixture is shaken, stirred, agitated, or other method of achieving temporary homogeneity of the purification mixture. In preferred embodiments, the purification mixture is shaken at 10 to 1000 rpm, preferably 50 to 500 pm, preferably 125 to 250 rpm, preferably 150 rpm.

In alternative embodiments, the contacting comprises delivering a mixture into a feed side of a chamber comprising the nanocomposite sorbent that divides the chamber into the feed side and a permeate side, such that at least a portion of the water permeates the nanocomposite sorbent and recovering from the permeate side purified water depleted in the organic pollutant compared to the water supplied to the feed side. The chamber used for the present method may be of any shape so long as the nanocomposite sorbent can be securely housed and utilized inside the chamber to accomplish the removal of the organic pollutant. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the water into contact with the nanocomposite sorbent. The water may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the water may stay stagnant over the nanocomposite sorbent or be stirred, shaken, or agitated as previously described.

In some embodiments, the water used in the method has a temperature of 1 to 99° C., preferably 20 to 90° C., preferably 21 to 75° C., preferably 25 to 50° C. In some embodiments, the water has a pH of 6.5 to 14, preferably 6.6 to 13, preferably 6.75 to 12, preferably 7 to 11. In preferred embodiments, the water and the nanocomposite sorbent are in contact for 5 to 120 minutes, preferably 15 to 105 minutes, preferably 30 to 90 minutes.

In some embodiments, the contacting is performed by passing the water through the nanocomposite sorbent. In some embodiments, the nanocomposite sorbent may be used in series with other currently known adsorption materials to enhance the removal of an organic pollutant from water or to remove a different type of impurity from water that is not an organic pollutant.

In terms of the present disclosure, the adsorption interaction between the organic pollutant and the nanocomposite sorbent may be chemisorption, physisorption, or mixtures thereof. In at least one embodiment, organic pollutant is adsorbed onto the nanocomposite sorbent via a physisorption process, meaning the process is primarily physical and preferably no chemical changes occur on the nanocomposite sorbent or organic pollutant.

In some embodiments, the water has an organic pollutant present in an amount of 0.01 to 1000 ppm, preferably 0.1 to 500 ppm, preferably 0.5 to 400 ppm, preferably 1 to 250 ppm, preferably 10 to 200 ppm, preferably 50 to 150 ppm. In some embodiments, the purified water has least 25% less organic pollutant than that present in the water before contact with the nanocomposite sorbent, preferably at least 30% less, preferably at least 40% less, preferably at least 50% less, preferably at least 60% less, preferably at least 70% less, preferably at least 80% less, preferably at least 90% less, preferably at least 95% less than that present in the water before contact with the nanocomposite sorbent. In a preferred embodiment, the purified water is substantially free of the organic pollutant, for example, the stream contains less than 10 ppm, preferably less than 1 ppm, preferably less than 100 ppb, preferably less than 1 ppb, preferably less than 0.1 ppb, preferably less than 1 ppt of the organic pollutant. In a most preferred embodiment, the purified water is devoid of the organic pollutant.

In one or more embodiments, the method of the present disclosure further involves eluting the organic pollutant from the nanocomposite sorbent, and reusing the nanocomposite sorbent. The eluting can be performed as described above. The nanocomposite sorbent of the present disclosure may be regenerated (i.e. eluted) and reused up to 3 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in the organic pollutant uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles.

The examples below are intended to further illustrate protocols for preparing and characterizing the nanocomposite sorbent discussed above and for assessing the organic pollutant adsorption properties of said nanocomposite sorbent and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Reagents and Equipment

The potassium persulfate, acrylic acid and acrylamide reagents used in the synthesis of the CNT-AaAm adsorbent were bought from Sigma Aldrich Company. 1000 mg/L stock solution of phenol (Merck Company, Darmstadt, Germany) was prepared in deionized distilled water. The solutions with different concentrations in mg/L were prepared by diluting of the stock solution using distilled water.

The method of Chemical Vapor Deposition (CVD) was used for the purpose of growing carbon nanotubes [S. Iijima, Nature, 354, (1991) 56; R. Saito, G. Dresselhaus and M. S. Dresselhaus, Imperial College Press, (1998); A. Loiseau, P. Launois, P. Petit, S. Roche and J.-P. Salvetat, Springer, (2006); and A. J. Hart and A. H. Slocum, Journal of Physical Chemistry B, 110, (2006) 8250-8257]. The machine utilized in order to grow the CNTs contains following separate elements from vendor AbsoluteNano as shown in FIG. 1: heating substrate (101), gas proportioner (102), gases (103), controller (104), preheater (105), furnace heater controller (106), and a SabreTube Desktop Thermal Processing System furnace (107).

The SabreTube furnace used in the growth of CNT is subjected to work in low-pressure conditions where the pressure is below the atmospheric pressure. The pressure is made to not cross more than 0.3 psi (2.0 KPa) over the atmospheric pressure. In the apparatus, a 0.5 mm thickness doped silicon bar is the main component of the heating element in the furnace. This silicon bar consisting element is mounted in the apparatus inside a tube made of quartz, which has both ends of the tube sealed closed. In this tube, the complete reaction and internal processes can be observed directly in a visual manner. In order to track the temperature changes of the heating element, an IR sensor is used, which is kept mounted below the quartz tube. The output of the IR sensor is kept equivalent to a thermocouple of Type K (40 mV at 800° C.).

In this method, in order to control the furnace, a control box is used that integrates IR sensor and power supply. A heating circuit is used that maintains the voltage used on the element below 50 volts and a maximum current of 15 Amps. Moreover, the output of the infrared sensor is typically mounted on the backside of the furnace and is integrated using a type K thermocouple jack, which is a commonly found size of the panel. In order to increase the gas temperature to 1020° C., they are passed through the pre-heating chamber. The pre-heating chamber is maintained at this temperature and enhances the reaction rate of the incoming gases. In this manner, the pre-heating process essentially increases the growth of CNT growth. Three different gases are used—Ethylene (99.5%), Hydrogen (99.999%), and Helium (99.999%) In this process, Helium has the purpose of displacement of the atmospheric air in the apparatus. Hydrogen is used in the pre-growth stage of the process to flow alongside the catalytic layer of Iron and aluminum oxide while subjected to high temperature. Ethylene is as a source gas to introduce hydrocarbons. In order to fluctuate and control the flow rate of individual gases, a gas proportioner apparatus is used. To produce CNTs, during the process of thermal CVD, a catalytic layer is used, which is aluminum oxide having a coating of Iron. However, before the addition of this aluminum oxide and Iron as a catalytic layer, a 100 nm thickness layer of silicon dioxide is developed on a silicon wafer. On the silicon dioxide layer, a layer of catalytic Iron and Aluminum oxide is evaporated using e-beam evaporator of Model Temescal FC2000 from e-beam FP and Atomic Layer Deposition (ALD). The iron oxide layer is formed due to air exposure and it then converts back to Fe and leads to the growth of catalytic Nano-particles when high temperature and hydrogen is subjected in the process.

Synthesis of Carbon Nanotubes

In order to grow highest quality CNTs; optimum conditions are used in terms of thickness of the catalytic, metal used as catalytic, temperature of the substrate, precise timing of introducing gas in the chamber, rate of flowing the gases, and specific gas types used. The fabrication process starts with 8×8 mm silicon wafer, on the top 100 nm of $SiO_2$ is deposited via sputtering and annealed in air at 450° C. for 2 hours. 10 nm of $Al_2O_3$ is deposited is deposited via atomic layer deposition (ALD) at 220° C. and annealed at 350° C. for 1 hour. Finally, a thin layer of Fe (1 nm) is evaporated onto the surface using e-beam evaporator of Model Temescal FC2000.

The entire procedure of growing CNTs begins with initial check to see that all of the valves are properly closed and that the furnace is not receiving power through controller before the sliding door is opened manually as shown in FIG. 1. After opening the sliding door, safety shield is removed from the furnace. Afterwards, a careful displacement of the quartz tube in the right side gives path to the chamber. The two 8×8 mm silicon device is placed in the chamber facing in up direction. After that, a silicon cap is then used to cover the downstream side of the substrate for observational purpose. It is also to be ensured that the cap's non-polished end should be in direct contact with the catalytic layer. Keeping all the power controller in off condition, helium gas is introduced through the valve (to achieve output reading of 50 psi) and on the gas proportioner, the helium gas should have 1,000 sccm and temperature is raised to 1020° C. after three minutes in pre-heater.

Figure 2A:
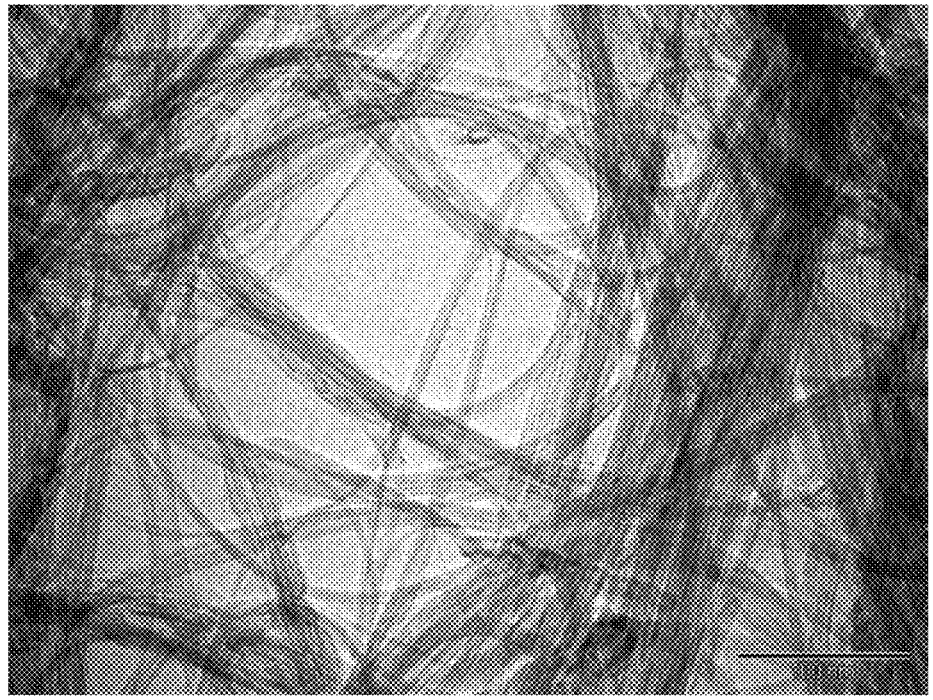
FIG. 2A is a transmission electron microscopy (TEM) image of the synthesized CNTs.
Figure 2B:
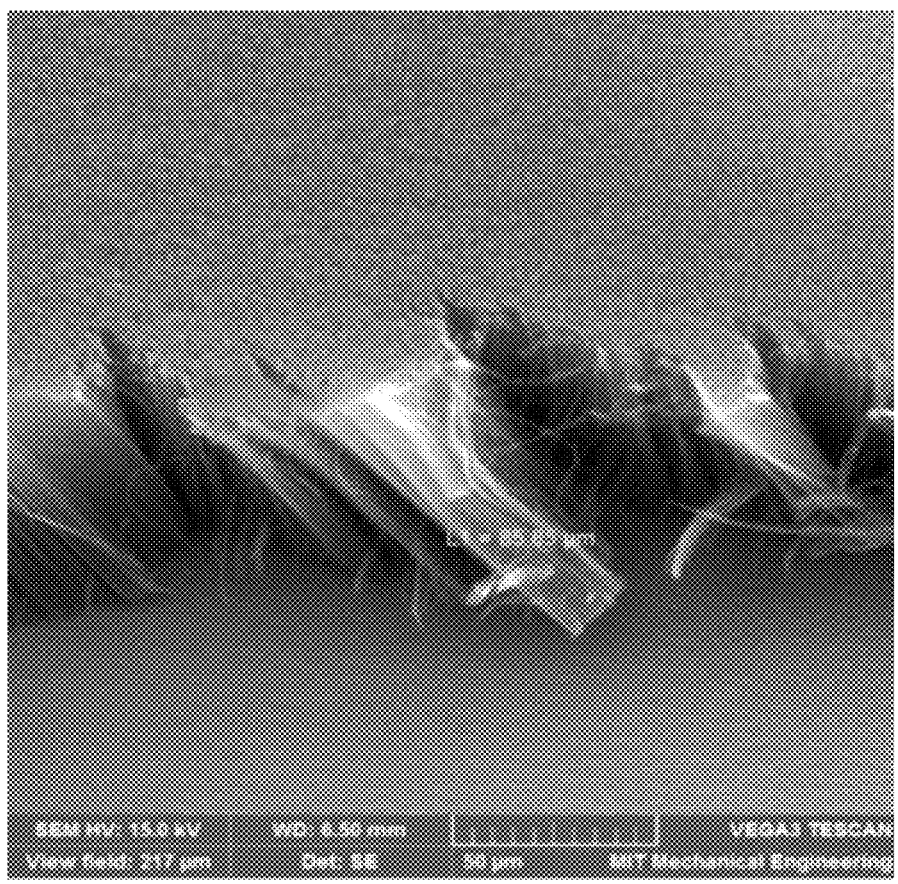
FIG. 2B is a scanning electron microscopy (SEM) image of the synthesized CNTs on a growth substrate.

At a constant flow, helium is passed through the pre-heater on temperature of 1020° C. After 5-10 minutes, hydrogen is released at 250 sccm controlled by the valve and helium is also reduced to 140 sccm for a period of two minutes. Furnace controller is turned on to reach 820° C. temperature and after that, temperature of the silicon substrate is stabilized in 30 seconds. In order to grow the CNTs, the flow of Ethylene is maintained at 120 sccm. At this stage, growth of CNT starts after waiting for 30 minutes. Valves for ethylene and hydrogen is closed, and both the preheater and furnace controller are turned off. Moreover, flow of helium is increased to 1,000 sccm and kept this way for five minutes of duration. In order to cool the system, helium flow is reduced to 120 sccm from 10 to 10 minutes. FIGS. 2A and 2B show high resolution SEM image captured using TES-CAN VEGA3 for the synthesized CNTs with the length of 85.85 μm at 30° C.

Synthesis of CNT-AaAm

Figure 3:
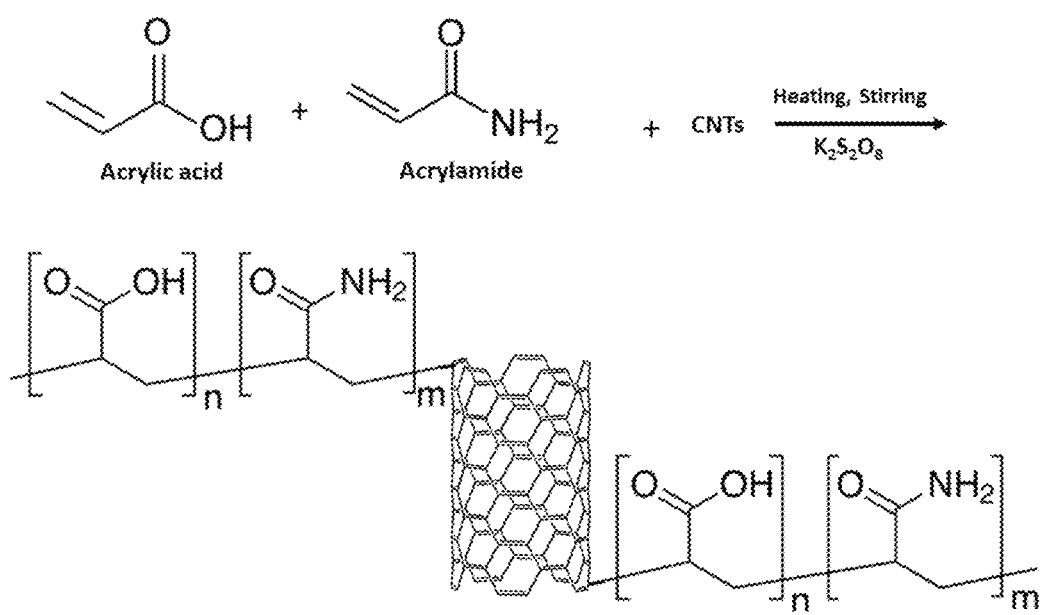
FIG. 3 shows an illustration of the structure of the nanocomposite sorbent comprising carbon nanotube-grafted acrylic acid/acrylamide copolymer composite.

For the synthesis of CNT-AaAm, CNTs were dispersed in deionized water in 500 ml round-bottom flask. The flask was left in the sonicator until particles were well dispersed. Then, around 5 g of acrylamide was added to the dispersed CNTs under agitation. After well mixing, 5 g of acrylic acid was added to the dispersed mixture under stirring conditions. The components were then heated at 50° C. Potassium persulfate was added to the mixture to initiate the polymerization. The obtained material was kept under stirring conditions until reaction completed. The obtained product was washed with deionized water several times, until the washings became clear, then filtered and dried in an air-dried oven at 80° C. for 2 days. Then, they were crushed and sieved to get uniform particle sizes. FIG. 3 shows the proposed structure of the prepared CNT-AaAm.

Batch Adsorption Procedure

The adsorbent was added to the phenol solution into a centrifuge tube and shaken at 150 rpm onto a shaker (Lab Line Instrument) to achieve equilibrium at different temperatures, 25, 50 and 75° C. After that, the supernatant phase separated from the mixture was analyzed at 510 nm wavelength using a UV-visible spectrophotometer (Perkin-Elmer Lambda 35 model, USA). To perform the kinetic studies, the adsorption runs were repeated at different intervals until reaching the equilibrium time. The batch experiments also were also taken place at various pH values changed from 2 to 8 using 0.1 M solution of HCl or NaOH. The each batch run was replicated three times to make sure the precision of the measured data.

The phenol adsorption (%) was calculated using following equation:

$$\text{Adsorption (\%)} = \frac{C_f - C_i}{C_i} \times 100$$

where $C_i$ (mg/L) and $C_f$ (mg/L) are the initial and final phenol concentrations, respectively. In order to evaluate the recycling performance of the adsorbent, the adsorption and desorption processes were repeated subsequently for seven times. The phenol adsorbed on the CNT-AaAm was desorbed using methanol. After each cycling the UV-measurement was conducted in triplicate.

The crystalline structure of the product was identified by X-ray diffraction (XRD) (Shimadzu XRD-7000, with monochromatic high-intensity Cu Kα radiation (λ=1.5406 Å)) with 2θ=10-90° and by a scan rate of 0.5°/min. The morphology, distribution and shape of the samples were obtained directly by Transmission Electron Microscopy (TEM) (Morgagni 268) and Scanning Electron Microscope (SEM) (Inspect S50). The sample was prepared for TEM analysis by dispersing in alcohol and shaking in an ultrasonic for 10 min. A suspended drop then was dried on the carbon-coated copper grid at room temperature.

Characterization of the Prepared CNTs

XRD Analysis

Figure 4:
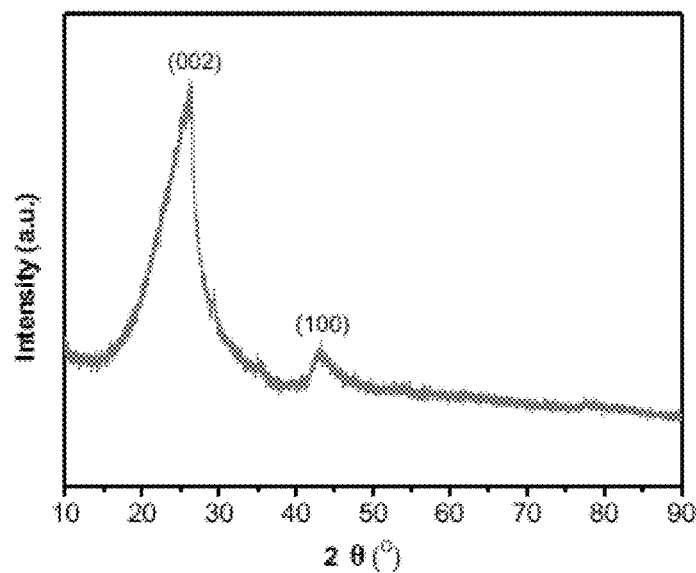
FIG. 4 shows the powder X-ray diffraction pattern of the as-synthesized CNTs.

FIG. 4 shows the XRD pattern of the main features of Carbon Nanotubes CNTs. The XRD studies of powder fabricated by Chemical Vapor Deposition (CVD) can be indexed the crystalline nature of CNTs (JCPDS number 96-101-1061) [Soleimani H, Baig M K, Yahya N, Khodapanah L, Sabet M, Demiral B M R, et al. Results Phys., 1, 9, (2018) 39-48]. The two strong diffraction peaks appear at 2θ=26.3° and 43.3° correspond to (002) and (100), respectively, and confirm it is highly crystalline [Saleh T A, Gondal M A, Drmosh Q A, Yamani Z H, A L-yamani A., Chem Eng J., 166, 1, (2011) 407-12 and Lafuente E, Callejas M A, Sainz R, Benito A M, Maser W K, Sanjuán M L, et al., Carbon, 46, 14, (2008) 1909-17]. The high crystallinity endows the material with high strength and modulus. The sharpness of the (002) peak indexes to the reflection of the hexagonal graphite structure of CNTs and is used to measure the crystal size of CNTs. The average crystal size (D) can be measured by Scherrer equation:

$$D = \frac{k\lambda}{\beta \cos\theta}$$

Where $\lambda$ is the wavelength (1.5406 Å), $\beta$ is the full width at half maximum (FWHM), $\theta$ is the diffraction angle, and k is the Scherer constant (0.91). Bragg's law derives to the Scherrer formula and it is limited to nanoscale particles only. The increase in the degree of crystallinity in the carbon materials makes XRD peaks more sharp. The parameters of CNTs are summarized in Table 1.

TABLE 1 d-spacing and crystallite size D of CNTs.

| 2θ° | d-spacing [Å] | (h k l) | FWHM | D (nm) |
|---|---|---|---|---|
| 26.2289 | 3.39493 | (0 0 2) | 1.40000 | 6.09 |

Morphological Analysis

FIGS. 2A and 2B illustrate the morphology of the CNTs. The bundles of carbon nanotubes appear clearly in the TEM image as shown in FIG. 2A. CNTs exhibit a straight morphology and the existence of the wall with high crystallinity. Additionally, CNT morphology was examined by SEM. FIG. 2B displays a SEM image of the CNTs. It shows soft surfaces and straight structures of the CNTs, this confirms that the carbon nanotubes were grown with good defined morphology.

Figure 5:
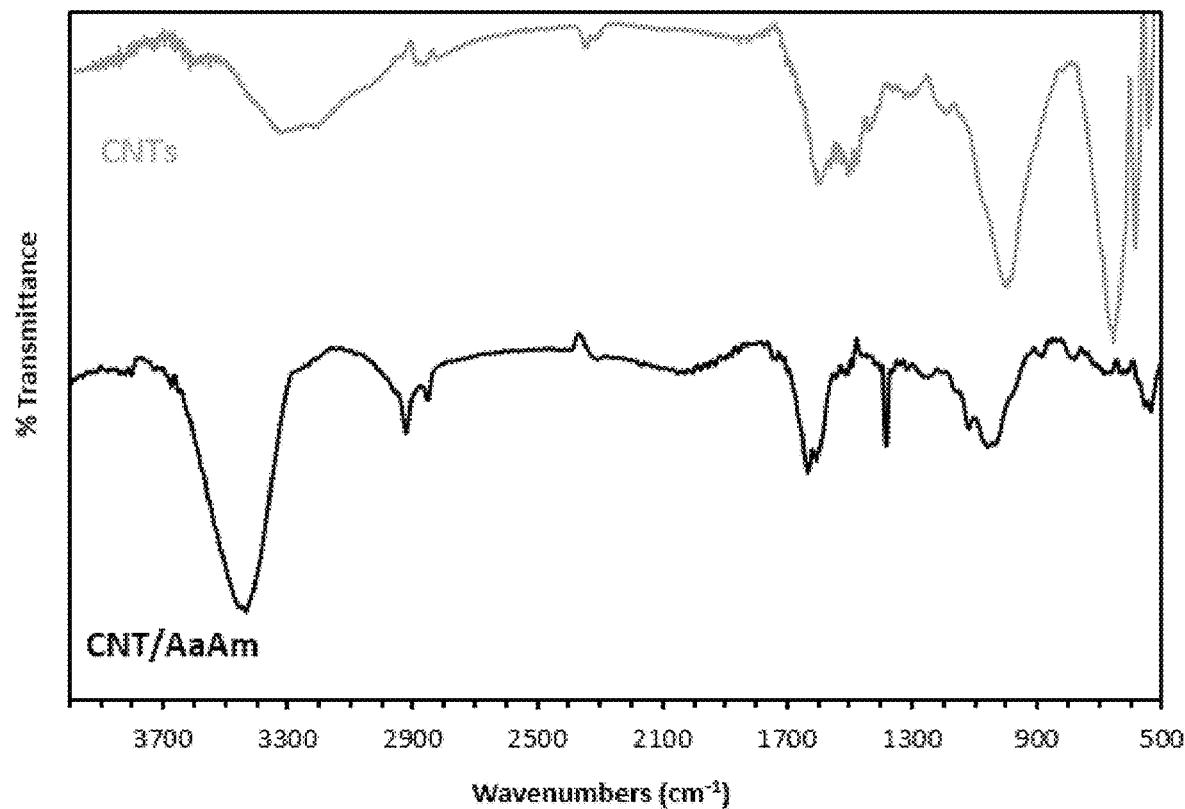
FIG. 5 shows the Fourier transform infrared (FTIR) spectrum of the as-synthesized CNTs and the nanocomposite sorbent.

The IR spectrum, FIG. 5, of CNTs indicates bands at wavenumbers 3444 cm$^{-1}$, which can be attributed to the stretching vibrations of isolated surface —OH moieties and —OH in carboxyl groups. The bands in the 1750-1550 cm$^{-1}$ range are attributed to C=C in aromatic rings and to C=O groups such as carboxylic acid, ketone/quinone. The bands at around 1310 to 940 cm$^{-1}$ indicate the presence of the bond of C—O in different chemical environment. The band at around 1550 cm$^{-1}$ is attributed to aromatic and unsaturated structure of C=C bonds. The band at around 1415 cm$^{-1}$ could be due to OH in-plane deformation and C—O [L. Stobinski, B. Lesiak, L. Kövér, J. Tóth, S. Biniak, G. Trykowski, J. Judek, Journal of Alloys and Compounds, 501, 1, (2010) 77-84].

Characterization of the Prepared CNT/AaAm

Figure 6A:
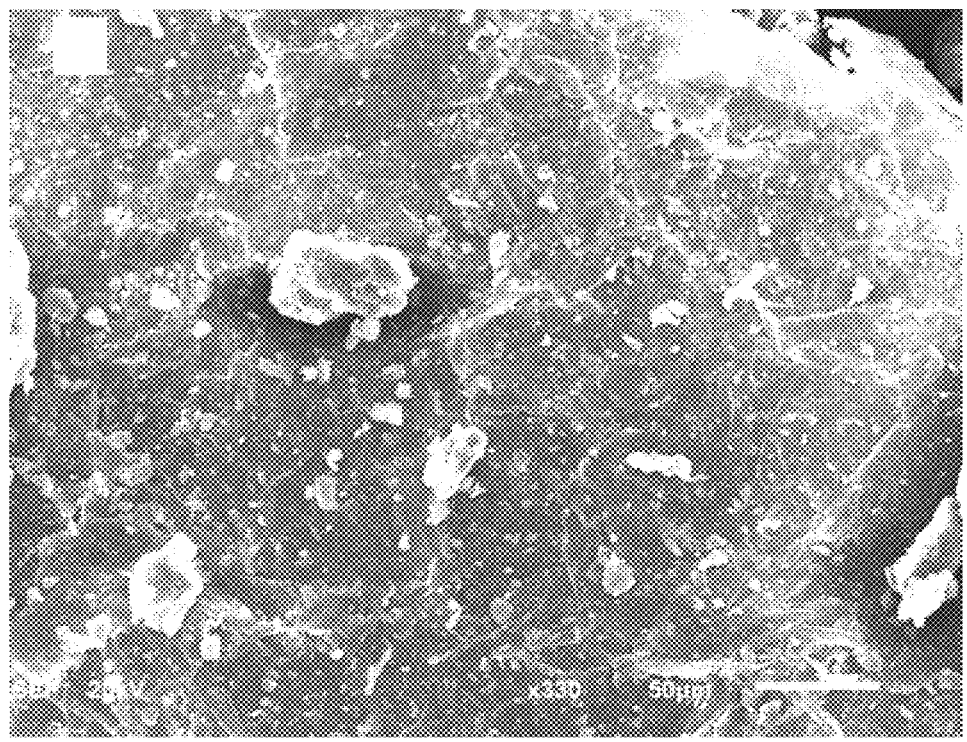
FIG. 6A is a low-magnification SEM image (×330) of the nanocomposite sorbent.
Figure 6B:
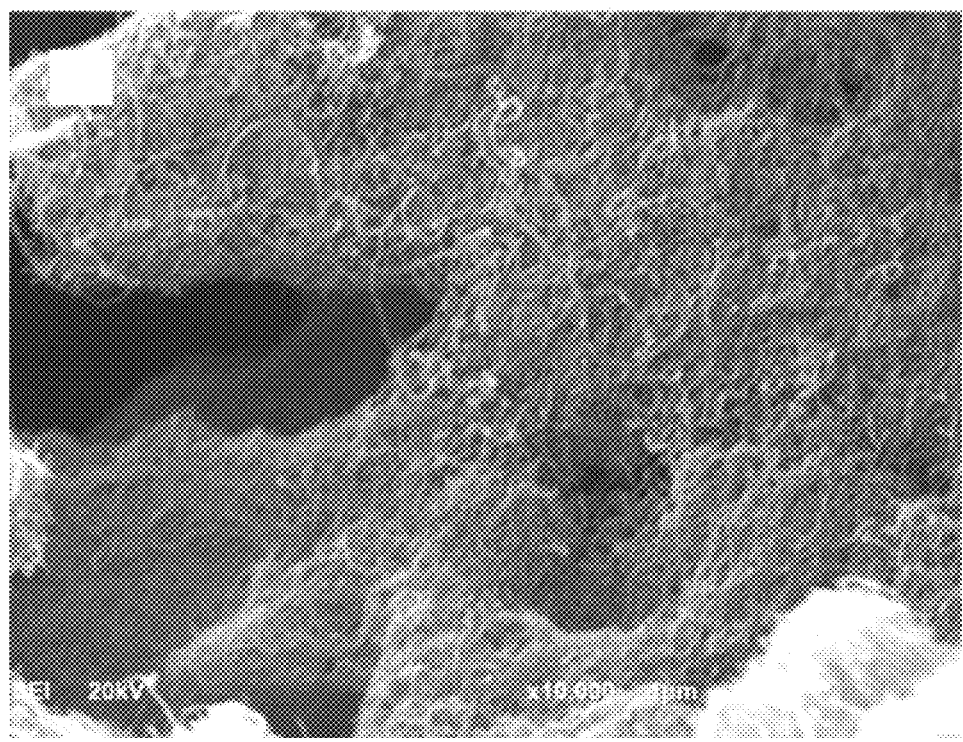
FIG. 6B is a high-magnification SEM image (×10,000) of the nanocomposite sorbent.
Figure 7:
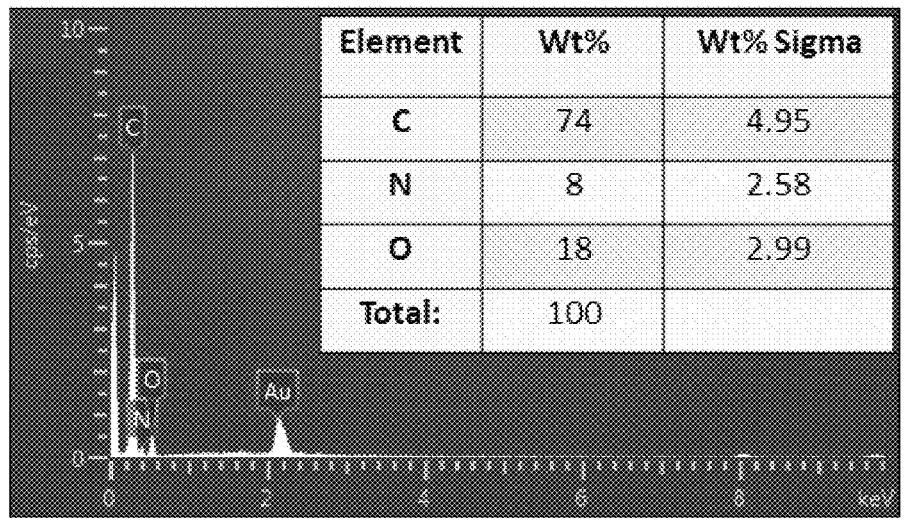
FIG. 7 shows the EDX spectrum of the nanocomposite sorbent.

The IR spectrum, FIG. 5, of CNT/AaAm indicates bands observed at the range of 3100-3500 cm$^{-1}$ is N—H stretching band of amine groups overlapped with the broad band in the range of 3400 cm$^{-1}$ of O—H. The weak peaks at 2900 cm$^{-1}$ are C—H stretching bands. The peak at 1581 cm$^{-1}$ is due to C=C stretching band. The C=O group connected to the carboxyl group gives an absorption peak at 1736 cm$^{-1}$ [Oldani M. & Schock G., J. Memb. Sci., 43, (1989) 243-258]. The C=O group connected to the amide group gives absorption peak at 1679 cm$^{-1}$ in aliphatic C—N stretching band is observed 1159-1173 cm$^{-1}$ [Smith B. C., CRC Press, 1998 and Tang C., Kwon Y. & Leckie J., J. Memb. Sci., 287, (2007) 146-156]. The SEM images of CNT/AaAm are shown in FIGS. 6A and 6B, which reveals the coarse surface of CNT/AaAm. The images indicate a surface where some polymer chains and nanotubes emerge from a continuous surface. The EDX spectrum, FIG. 7, indicates the CNT/AaAm consists of carbon, oxygen, and nitrogen. It should be mentioned that although hydrogen is part of the structure, it is usually not detected by the SEM/EDX equipment.

Adsorption Efficiency

The prepared CNT/AaAm was evaluated for its efficiency for the removal of phenol from waters. In order to optimize the experimental parameters and get insights into the best experimental conditions, design of experiments (95% confidence limit) was established to get insights on the interactions between the experimental conditions that affect the sorption. Experimental conditions or factors that were optimized here include pH, adsorbent dosage, contact time and the initial concentration. −1, 0, 1 were used to represent the low, mid and high levels for the parameters with the generated data are shown in Table 2 and Table 3. The experimental; tests were performed and the response was inserted for analysis.

TABLE 2

Design matrix of the factorial design (DOE).

| Variable | Low(−) | Central point (0) | High(+) |
|---|---|---|---|
| pH | 3 | 7 | 11 |
| Adsorbent dosage (D) (mg) | 10 | 500 | 200 |
| Contact time (T) (min) | 5 | 30 | 90 |
| Initial concentration (C) (ppm) | 5 | 10 | 50 |

TABLE 3

Experimental set

| Experiment | pH | Dosage | Time | Concentration | Recovery(%) |
|---|---|---|---|---|---|
| 1 | −1 | −1 | −1 | −1 | 15 |
| 2 | 1 | −1 | −1 | −1 | 25 |
| 3 | −1 | 1 | −1 | −1 | 30 |
| 4 | 1 | 1 | −1 | −1 | 36 |
| 5 | −1 | −1 | 1 | −1 | 42 |
| 6 | 1 | −1 | 1 | −1 | 63 |
| 7 | −1 | 1 | 1 | −1 | 75 |
| 8 | 1 | 1 | 1 | −1 | 100 |
| 9 | −1 | −1 | −1 | 1 | 50 |
| 10 | 1 | −1 | −1 | 1 | 55 |
| 11 | −1 | 1 | −1 | 1 | 45 |
| 12 | 1 | 1 | −1 | 1 | 60 |
| 13 | −1 | −1 | 1 | 1 | 30 |
| 14 | 1 | −1 | 1 | 1 | 55 |
| 15 | −1 | 1 | 1 | 1 | 95 |
| 16 | 1 | 1 | 1 | 1 | 100 |
| 17 | 0 | 0 | 0 | 0 | 97 |
| 18 | 0 | 0 | 0 | 0 | 97 |
| 19 | 0 | 0 | 0 | 0 | 96 |
| 20 | 0 | 0 | 0 | 0 | 95 |
| 21 | 0 | 0 | 0 | 0 | 97 |

Figure 8A:
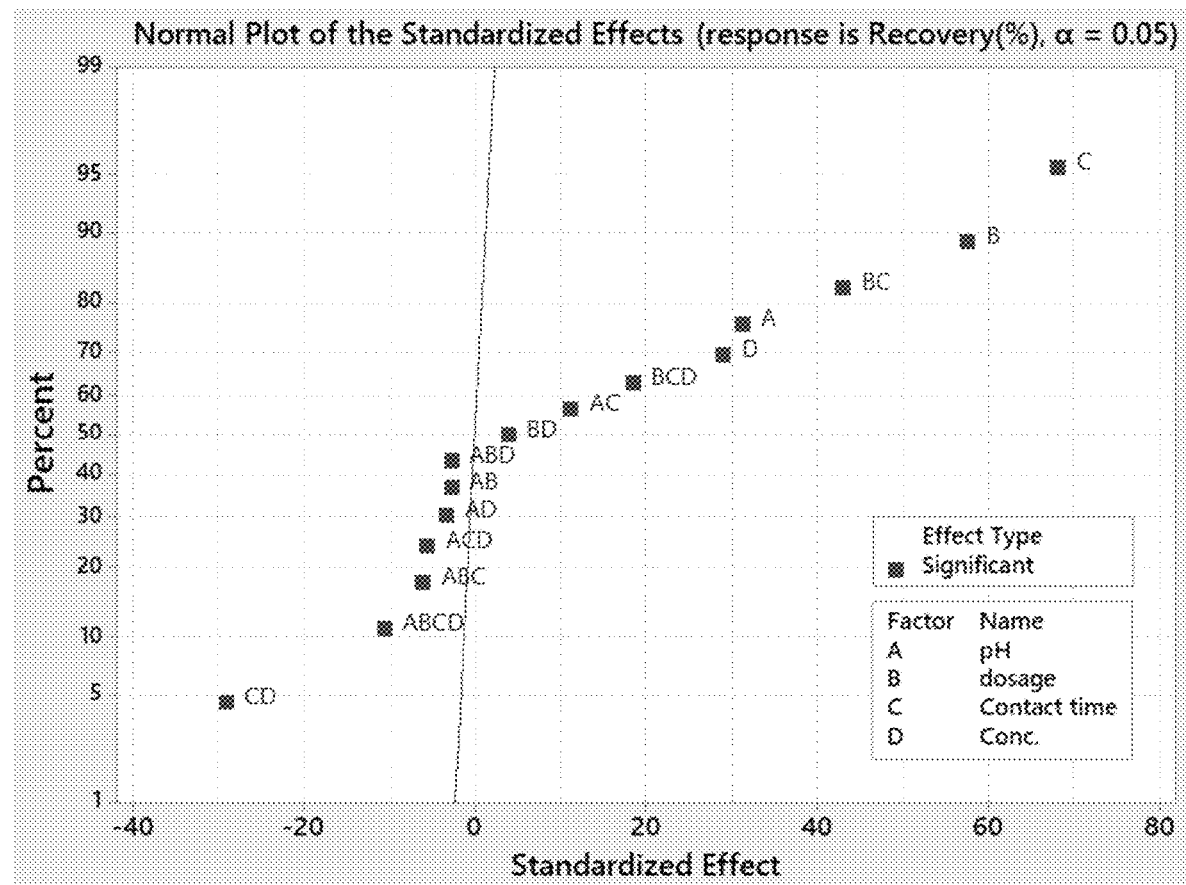
FIGS. 8A-8C show the factorial design plots of phenol adsorption over the nanocomposite sorbent, where
Figure 8B:
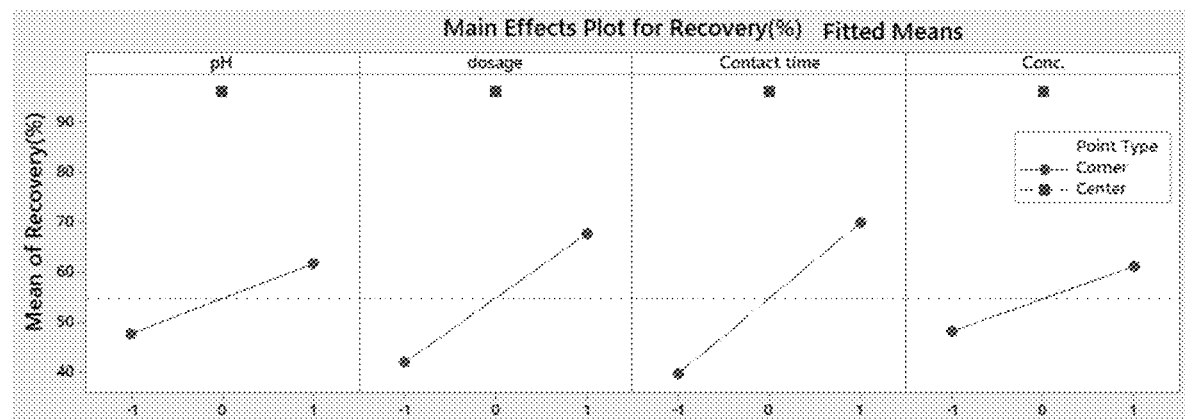
Figure 8C:
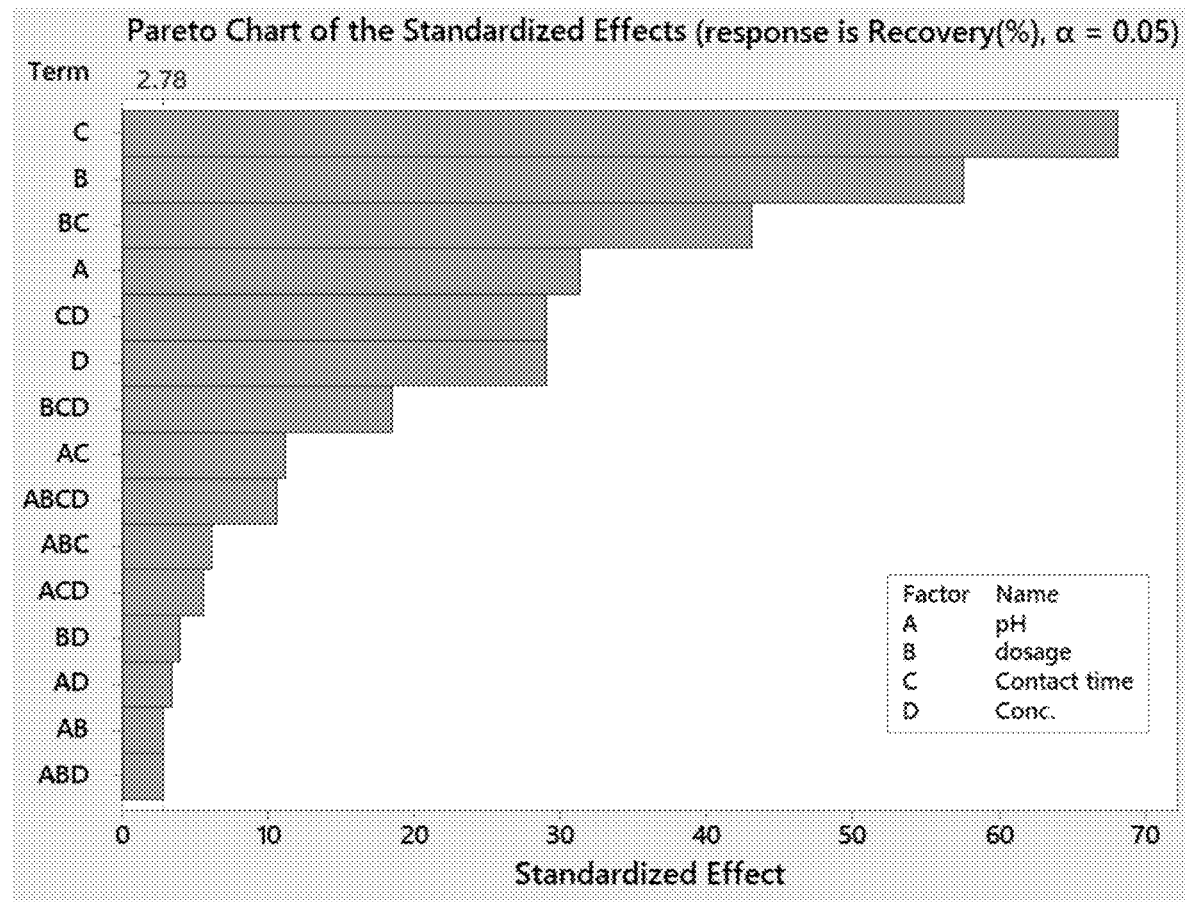
Figure 9:
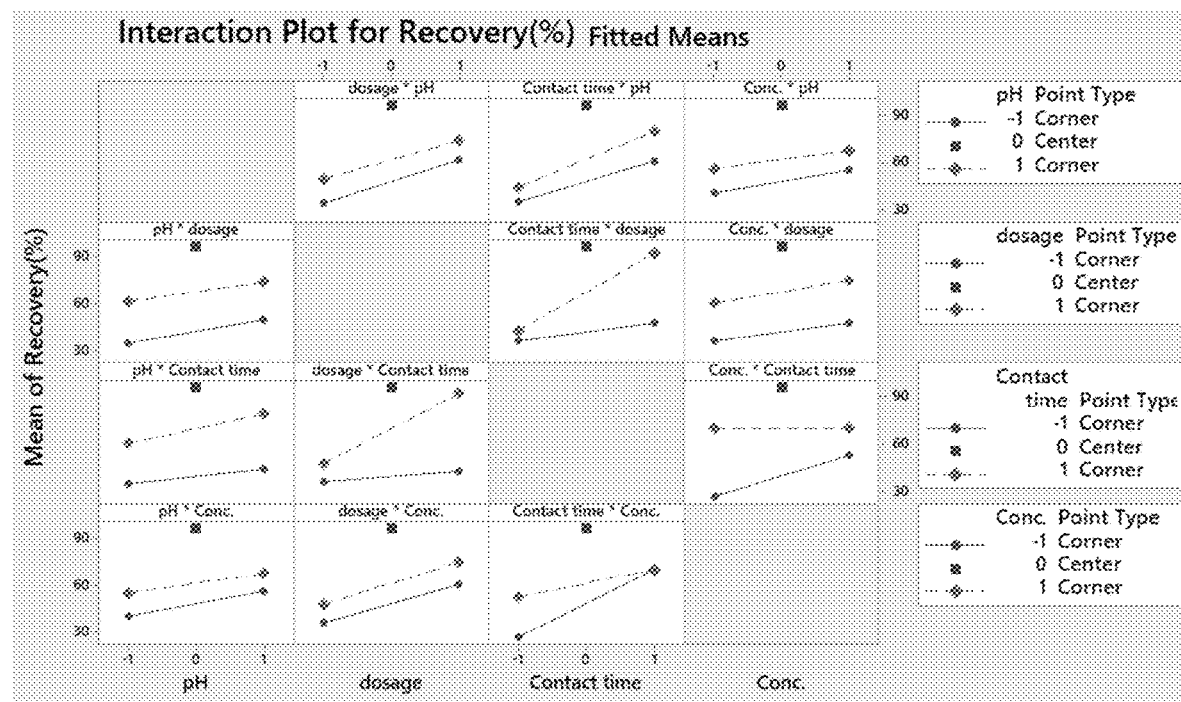
FIG. 9 shows the interaction plots for the response of data means for the adsorption of phenol over the nanocomposite sorbent.

The normal plot of the standardized effects was conducted to verify the normality of the data, FIG. 8A-8C. The significance level for this model was chosen to be 0.05 (95% confidence level). A reference line is drawn to indicate that the factors which extend past this line are potentially important. The effects that are above the reference line are statistically significant at 95% confidence level. Contact time and the dosage are the highest two factors affecting more the adsorption. Among the interactions between the factors, the interaction between the dosage and the contact time was significantly affecting the process. Main effect and Pareto plots indicate also the parameters affecting more the adsorption. FIG. 9 depicts the interaction plots for the response of data means for the adsorption of phenol over CNT-AaAm. The magnitude of effects of each factor and their interactions found to increase in the following order dosage and contact time>initial concentration and contact time>contact time and pH. The decrease in the solution pH to 3.0 decreased the % removal of the phenol while the adsorption was higher at higher pH.

Recycling Performance of the Synthesized CNT-AaAm

Figure 10:
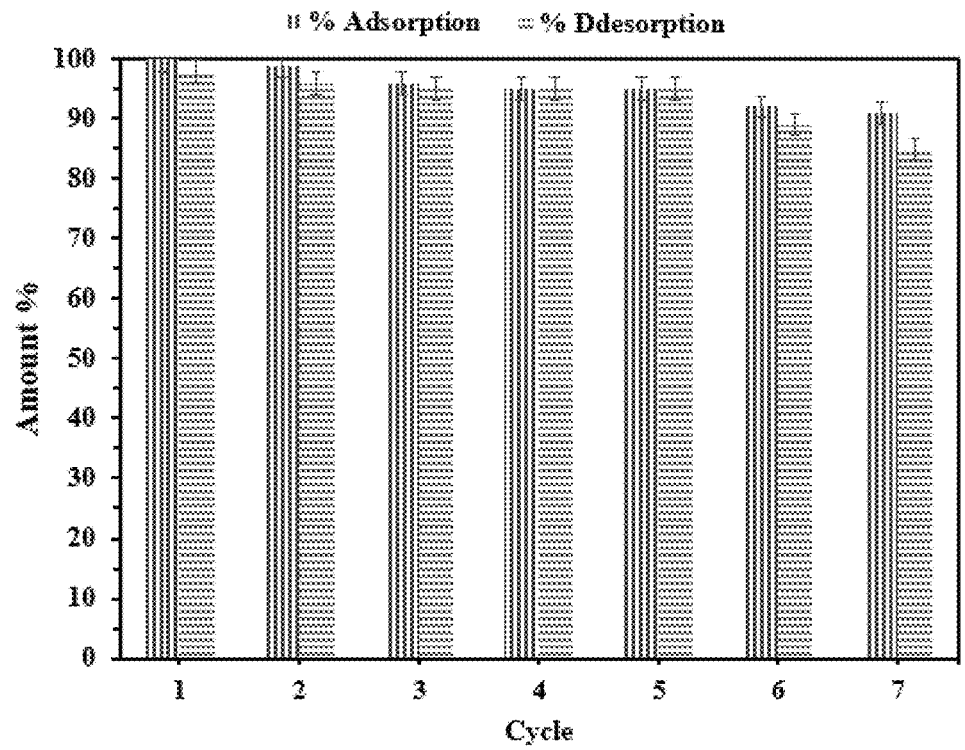
FIG. 10 shows the recycling performance of the nanocomposite sorbent for the adsorption and desorption of phenol over the nanocomposite sorbent.

The disposal of the used adsorbent can cause considerable environmental trouble because of the great quantity of discharged toxic pollutant. It is a clear fact that the reimburse obligation for new adsorbents after every adsorption process is non-economical. Therefore, to study the recycling prospective of the used adsorbent, a renewal process that included the following adsorption/desorption cycles was conducted for the synthesized CNT-AaAm sorbent. FIG. 10 indicates regeneration yields of the developed sorbent during the seven cycles. As seen from the results, the adsorption and desorption yields were still over 95% up to the first five cycles. After that, the adsorption efficiency was slightly reduced to 91%. This indicates that the prepared CNT-AaAm has reasonable recycling performance for the phenol removal from aqueous solutions.

Proposed Mechanisms of Interactions

Figure 11:
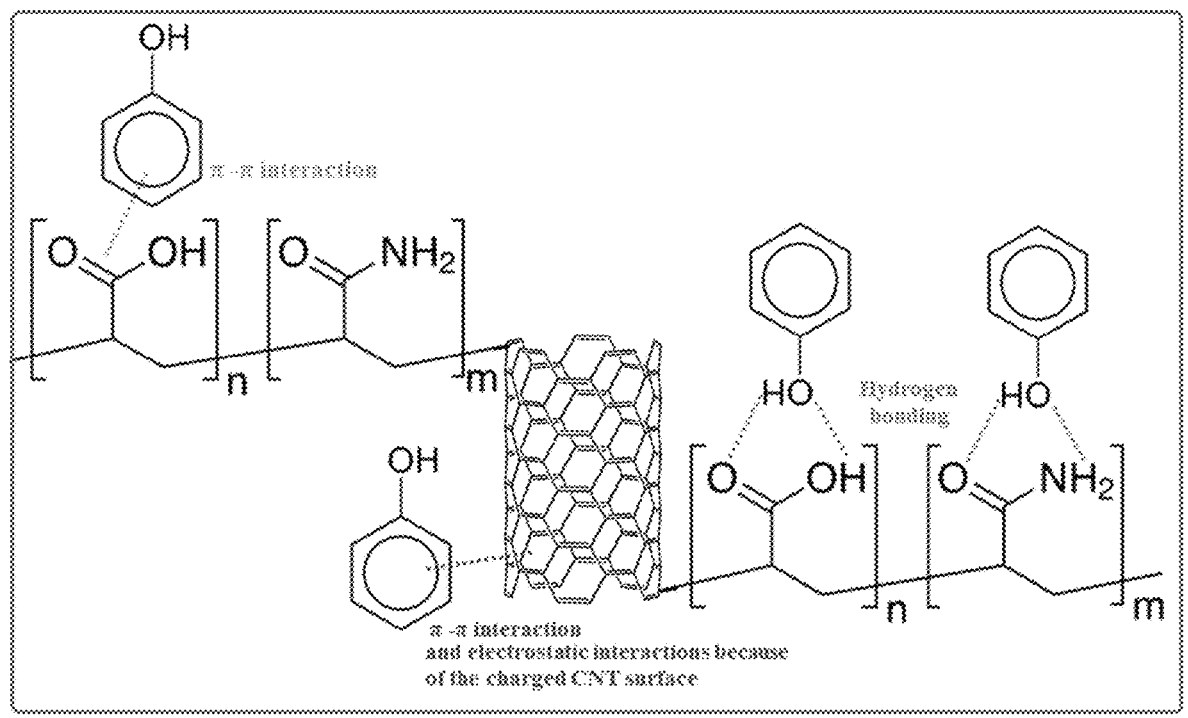
FIG. 11 shows a depiction of the physisorption interactions between phenol and the nanocomposite sorbent.

There are several possible phenol-adsorbent interaction mechanisms involving π-π interaction between the bulk π system on the material surfaces and phenol rings. It includes also hydrogen bonds because of the polymer chain grafted on CNTs), and electrostatic interactions due to the charged CNT surface. In addition, the outer surface of the nanotubes provide distributed hydrophobic sites for organic pollutants, however, hydrophobic interactions may not completely explain the interactions between phenol and CNTs. Thus, various adsorption mechanisms respond differently to the change in environmental conditions. Based on this, there could be multiple mechanisms acting simultaneously. The removal of phenol may comprise the interactions illustrated in FIG. 11.

The invention claimed is:

1. A method of preparing a nanocomposite sorbent comprising a carbon nanotube-grafted acrylic acid/acrylamide copolymer composite, the method comprising:
    mixing an aqueous suspension of pristine carbon nanotubes with acrylic acid and acrylamide to form a dispersion,
    adding a polymerization initiator to form a reaction mixture,
    heating the reaction mixture to a temperature of 25 to 100° C., and
    isolating the nanocomposite sorbent,
    wherein a weight ratio of acrylic acid to acrylamide in the reaction mixture is 0.75:1 to 1.25:1,
    wherein the nanocomposite sorbent comprises carbon nanotubes that are covalently bonded to the acrylic acid/acrylamide copolymer composite through a carbon-carbon bond; and
    wherein the carbon nanotubes have a length of 50 to 125 µm and an averge diameter of 5 to 7 nm.

2. The method of claim 1, wherein the carbon nanotubes are present in the nanocomposite sorbent in an amount of 0.01 to 2 wt % based on a total weight of the nanocomposite sorbent.

3. The method of claim 1, wherein the carbon nanotubes are prepared by chemical vapor deposition of ethylene at a temperature of 800 to 1100° C.

4. The method of claim 1, wherein the mixing comprises adding acrylamide to a suspension of carbon nanotubes then adding acrylic acid.

5. The method of claim 1, wherein the polymerization initiator is an alkali metal persulfate salt.

6. The method of claim 1, wherein the nanocomposite sorbent comprises 70 to 80 wt % carbon, 5 to 10 wt % nitrogen, and 10 to 25 wt % oxygen, based on a total weight of non-hydrogen elements of the nanocomposite sorbent.

7. The method of claim 1, wherein the nanocomposite sorbent has a phenol adsorption capacity of 5 to 2500 µg of phenol per mg of nanocomposite.

8. A nanocomposite sorbent, comprising:
    a carbon nanotube-grafted acrylic acid/acrylamide copolymer composite, wherein the carbon nanotube-grafted acrylic acid/acrylamide copolymer composite comprises
        37.5 to 62.5 wt % of poly(acrylic acid),
        0.01 to 2 wt % of carbon nanotubes, and
        the remaining wt % of polyacrylamide, each based on a total weight of the carbon nanotube-grafted acrylic acid/acrylamide copolymer composite,
    wherein a weight ratio of poly(acrylic acid) to polyacrylamide in the carbon nanotube-grafted acrylic acid/acrylamide copolymer composite is 0.75:1 to 1.25:1,
    wherein the carbon nanotubes are covalently bonded to the acrylic acid/acrylamide copolymer composite through a carbon-carbon bond, and
    wherein the carbon nanotubes have no functionalization other than the covalent bond to the acrylic acid/acrylamide copolymer and
    wherein the carbon nanotubes have a length of 50 to 125 µm and an average diameter of 5 to 7 nm.

9. The nanocomposite sorbent of claim 8, wherein the nanocomposite sorbent comprises 70 to 80 wt % carbon, 5 to 10 wt % nitrogen, and 10 to 25 wt % oxygen, each based on a total weight of non-hydrogen elements of the nanocomposite sorbent.

10. The nanocomposite sorbent of claim 8, wherein the nanocomposite sorbent has a reversible phenol adsorption capacity of 5 to 2500 µg of phenol per mg of nanocomposite sorbent.

11. The nanocomposite sorbent of claim 10, wherein the nanocomposite sorbent retains 90 to 100% of the reversible phenol adsorption capacity after 6 cycles of adsorption-elution.

12. A method for removing an organic pollutant from water, comprising:
    contacting water containing the organic pollutant with the nanocomposite sorbent of claim 8.

13. The method of claim 12, wherein the nanocomposite sorbent is employed in an amount of 0.2 to 20 mg per mL of the water.

14. The method of claim 12, further comprising eluting the organic pollutant from the nanocomposite sorbent by washing with a wash solvent.

15. The method of claim 12, wherein the water has a pH of 6.5 to 14 and the nanocomposite sorbent is contacted with the water for 5 to 120 minutes.

16. The method of claim 12, wherein the organic pollutant is a phenol.

17. The method of claim 14, wherein the nanocomposite sorbent has a reversible phenol adsorption capacity of 5 to 2500 µg of phenol per mg of nanocomposite sorbent.

18. The method of claim 17, wherein the nanocomposite sorbent retains 90 to 100% of the reversible phenol adsorption capacity after 6 cycles of adsorption-elution.

\* \* \* \* \*